(12) United States Patent
Mandl et al.

(10) Patent No.: US 7,433,376 B1
(45) Date of Patent: Oct. 7, 2008

(54) ZIG-ZAG LASER WITH IMPROVED LIQUID COOLING

(75) Inventors: Alexander E. Mandl, Brookline, MA (US); Daniel E. Klimek, Lexington, MA (US); Richard Hayes, Danvers, MA (US)

(73) Assignee: Textron Systems Corporation, Wilmington, MA (US)

( * ) Notice: Subject to any disclaimer, the term of this patent is extended or adjusted under 35 U.S.C. 154(b) by 0 days.

(21) Appl. No.: 11/500,269

(22) Filed: Aug. 7, 2006

(51) Int. Cl.
*H01S 3/04* (2006.01)
(52) U.S. Cl. .............................. 372/35; 372/40; 372/41; 372/34
(58) Field of Classification Search .............. 372/45.01, 372/70, 35, 34, 40, 41; 165/80.4; 398/141
See application file for complete search history.

(56) References Cited

U.S. PATENT DOCUMENTS

| | | | |
|---|---|---|---|
| 3,584,230 A | 6/1971 | Tien | 398/141 |
| 3,631,362 A | 12/1971 | Almasi et al. | 331/94.5 |
| 3,633,126 A | 1/1972 | Martin et al. | 372/35 |
| 3,810,041 A | 5/1974 | Martin | 372/51 |
| 4,013,366 A | 3/1977 | Philbert | 356/492 |
| 4,228,406 A | 10/1980 | Lewis et al. | 372/33 |
| 4,244,045 A | 1/1981 | Nosu et al. | 398/86 |
| 4,295,739 A | 10/1981 | Meltz et al. | 374/161 |
| 4,432,091 A | 2/1984 | Kuroda et al. | 372/45.01 |
| 4,528,671 A | 7/1985 | Robbins | 372/68 |
| 4,617,669 A | 10/1986 | Kuhn | 372/70 |
| 4,876,694 A | 10/1989 | Hughes | 372/93 |
| 4,881,233 A | 11/1989 | Von Arb et al. | 371/35 |
| 4,897,845 A | 1/1990 | Utaka et al. | 372/50.22 |
| 4,984,246 A | 1/1991 | Cabaret et al. | 372/69 |
| 5,088,105 A | 2/1992 | Scifres et al. | 372/92 |

(Continued)

FOREIGN PATENT DOCUMENTS

DE 2725675 A1 12/1977

(Continued)

OTHER PUBLICATIONS

Mandl, A., et al., "Flashlamp-Pumped Cr:LiSAF Thin-Slab Zigzag Laser", IEEE Journal of Quantum Electronics, Oct. 1998, pp. 1992-1995, vol. 34, No. 10.

(Continued)

*Primary Examiner*—Lincoln Donovan
*Assistant Examiner*—Antony M. Paul
(74) *Attorney, Agent, or Firm*—BainwoodHuang (57) ABSTRACT

A zig-zag laser has the ability to generate a high power beam while effectively removing heat without degrading the beam quality. The laser has a series of gaps interposed between the thin slabs, the gain medium, and between the thin slabs and the quartz windows to receive coolant and cool the cell assembly. The coolant flows transversely relative to the path of the laser and the flow of the coolant is in the opposite direction on each side of the thin slab to minimize the temperature gradient. The gaps in conjunction with the inner channel portions in the secondary manifold flow the coolant through the cell assembly in a laminar manner therein not degrading the laser beam quality. A transparent quartz/quartz interface between the secondary manifold and the cell assembly allow the fluorescence to move away from the cell assembly and minimizes heat in the cell assembly.

16 Claims, 9 Drawing Sheets

U.S. PATENT DOCUMENTS

| | | | | |
|---|---|---|---|---|
| 5,099,311 | A | 3/1992 | Bonde et al. | 165/80.4 |
| 5,121,403 | A * | 6/1992 | Sekino | 372/72 |
| 5,218,515 | A | 6/1993 | Bernhardt | 361/689 |
| 5,260,959 | A | 11/1993 | Hayakawa | 372/45.01 |
| 5,271,031 | A | 12/1993 | Baer | 372/93 |
| 5,307,430 | A | 4/1994 | Beach et al. | 385/31 |
| 5,363,397 | A | 11/1994 | Collins et al. | 372/92 |
| 5,394,415 | A | 2/1995 | Zucker et al. | 372/26 |
| 5,436,759 | A | 7/1995 | Dijaili et al. | 359/333 |
| 5,453,641 | A | 9/1995 | Mundinger et al. | 257/714 |
| 5,491,710 | A | 2/1996 | Lo | 372/45.011 |
| 5,548,605 | A | 8/1996 | Benett et al. | 372/36 |
| 5,557,628 | A | 9/1996 | Kuba et al. | 372/70 |
| 5,568,498 | A | 10/1996 | Nilsson | 372/43.01 |
| 5,583,683 | A | 12/1996 | Scobey | 398/79 |
| 5,621,747 | A | 4/1997 | Kitoh et al. | 372/45.01 |
| 5,629,954 | A | 5/1997 | Jansen et al. | 372/43.01 |
| 5,640,480 | A | 6/1997 | Komine | 385/122 |
| 5,646,773 | A | 7/1997 | Injeyan et al. | 359/337 |
| 5,651,021 | A | 7/1997 | Richard et al. | 372/92 |
| 5,666,372 | A | 9/1997 | Ball et al. | 372/6 |
| 5,666,375 | A | 9/1997 | Yokouchi et al. | 372/45.01 |
| 5,707,139 | A | 1/1998 | Haitz | 362/231 |
| 5,737,353 | A | 4/1998 | Sasaki | 372/45.01 |
| 5,771,255 | A | 6/1998 | Horiuchi et al. | 372/31 |
| 5,828,683 | A | 10/1998 | Freitas | 372/36 |
| 5,987,043 | A | 11/1999 | Brown et al. | 372/36 |
| 5,991,315 | A | 11/1999 | Injeyan et al. | 372/11 |
| 6,075,803 | A * | 6/2000 | Bull et al. | 372/75 |
| 6,104,738 | A | 8/2000 | Kitoh et al. | 372/46.01 |
| 6,134,258 | A | 10/2000 | Tulloch et al. | 372/99 |
| 6,151,342 | A | 11/2000 | Nightingale et al. | 371/36 |
| 6,154,479 | A | 11/2000 | Yoshikawa et al. | 372/96 |
| 6,222,867 | B1 | 4/2001 | Inomoto et al. | 372/50.1 |
| 6,229,831 | B1 | 5/2001 | Nightingale et al. | 372/36 |
| 6,240,114 | B1 | 5/2001 | Anselm et al. | 372/45.01 |
| 6,240,116 | B1 | 5/2001 | Lang et al. | 372/50.12 |
| 6,284,085 | B1 * | 9/2001 | Gwo | 156/273.7 |
| 6,339,607 | B1 | 1/2002 | Jiang et al. | 372/50.124 |
| 6,347,108 | B2 | 2/2002 | Jiang et al. | 372/50.01 |
| 6,347,109 | B1 | 2/2002 | Beach et al. | 372/75 |
| 6,370,297 | B1 | 4/2002 | Hakimi et al. | 385/27 |
| 6,521,516 | B2 | 2/2003 | Monzon et al. | 438/514 |
| 6,571,569 | B1 | 6/2003 | Rini et al. | 62/259.2 |
| 6,587,488 | B1 | 7/2003 | Meissner et al. | 372/29.01 |
| 6,625,194 | B1 | 9/2003 | Kaneda | 372/71 |
| 6,625,354 | B2 | 9/2003 | Hollister et al. | 385/36 |
| 6,690,696 | B2 * | 2/2004 | Byren et al. | 372/35 |
| 6,822,994 | B2 | 11/2004 | Kennedy | 371/66 |
| 6,937,629 | B2 | 8/2005 | Perry et al. | 371/35 |
| 7,103,078 | B2 * | 9/2006 | Perry et al. | 372/35 |
| 2001/0021214 | A1 | 9/2001 | Jiang et al. | 372/50.1 |
| 2002/0067537 | A1 * | 6/2002 | Islam | 359/337 |
| 2002/0105997 | A1 | 8/2002 | Zhang | 372/70 |
| 2002/0114372 | A1 | 8/2002 | Montagne | 372/75 |
| 2003/0012246 | A1 | 1/2003 | Klimek et al. | 372/70 |
| 2003/0198264 | A1 | 10/2003 | Vetrovec et al. | 372/35 |
| 2004/0067016 | A1 | 4/2004 | Anikitchev et al. | 385/34 |
| 2004/0114657 | A1 | 6/2004 | Vetrovec | 372/70 |
| 2004/0258123 | A1 * | 12/2004 | Zamel et al. | 372/69 |
| 2005/0069260 | A1 | 3/2005 | Klimek et al. | 385/50 |
| 2005/0152426 | A1 | 7/2005 | Dell' Acqua et al. | 372/69 |
| 2005/0157381 | A1 * | 7/2005 | Kafka et al. | 359/346 |
| 2005/0249258 | A1 | 11/2005 | Rothenberg et al. | 372/70 |
| 2005/0254536 | A1 | 11/2005 | Hackel et al. | 372/39 |

FOREIGN PATENT DOCUMENTS

| | | |
|---|---|---|
| DE | 19954093 A1 | 11/1999 |
| EP | 0342953 A2 | 11/1989 |
| EP | 0877264 A2 | 11/1998 |
| EP | 1056228 A2 | 11/2000 |

OTHER PUBLICATIONS

Apollonov, V.V. et al., "Intensification of heat transfer in high-power laser diode bars by means of a porous metal heat-sink," Optics Express, vol. 4 (No. 1), p. 27-32, (Jan. 4, 1999), Optical Society of America.

Klimek, Daniel E., et al., "Dye Laser Studies Using Zig-Zag Optical Cavity," IEEE Journal of Quantum Electronics, Jun. 1994, pp. 1459-1462, vol. 30, No. 6.

Mandl, A., et al., "Chirp Control of a Single-Mode, Good Beam Quality, Zigzag Dye Laser," IEEE Journal of Quantum Electronics, Mar. 1997, pp. 303-306, vol. 33, No. 3.

Mandl, A.; Klimek, D, "Multipulse Operation of a High Average Power, Good Beam Quality Zigzag Dye Laser," IEEE Journal of Quantum Electronics, Mar. 1996, pp. 378-372, vol. 32, No. 3.

Mandl, A.; Klimek, D, "Single-Mode Operation of a Long-Pulse Flashlamp Pumped Dye Laser," IEEE Journal of Quantum Electronics, Feb. 1995, pp. 346-351, vol. 31, No. 2.

Mandl, A., et al., "CR:LiSAF Thin Slab Zigzag Laser," IEEE Journal of Quantum Electronics, Oct. 1997, pp. 1864-1868, vol. 33, No. 10.

* cited by examiner

ZIG-ZAG LASER WITH IMPROVED LIQUID COOLING

BACKGROUND

Lasers are used for many purposes including measuring, labeling and marking, printing, and material processing. Certain applications require high power lasers such as material processing including welding, particle acceleration, and certain military applications.

One type of laser that has been used for high power applications is a zig-zag laser. In a zig-zag laser, the beam path travels in a zig-zag fashion relative to the longitudinal axis of the active region or gain medium. The beam can pass through various mediums including the coolant.

In the generation of high power in a laser, there are several issues that need to be addressed, including the removal of heat from the laser and the management of thermal effects. If the thermal effects are not properly managed, both the power efficiency and the quality of the output or beam can be affected. The quality of the beam is generally related to the ability of the beam to focus in far field, that is the "beam parameter product" which takes into account the beam radius and the beam divergence.

SUMMARY

As the size of the laser increases, the amount of heat associated with the laser increases. Therefore the scalablity of the laser is limited. In addition, the beam quality is affected by various factors including the coolant through which the beam passes.

Unfortunately the conventional methods of cooling lasers have not allowed for an increase in power while maintaining beam quality. In contrast to the conventional lasers, the improved zig-zag laser has a laser head that has the ability to generate a high power beam while effectively removing heat without degrading the beam quality.

In one arrangement, a zig-zag laser head has a cell assembly and a pair of flow manifolds. The cell assembly includes a plurality of thin laser slabs for lasing and a pair of windows. Each of the thin slabs has a thickness in a lateral direction, a height in a transverse direction (parallel to the coolant flow), and a length in a longitudinal direction. The thin slabs are parallel to each other. The thin slabs define a gap between adjacent slabs. Each of the windows is positioned so that the plurality of thin slabs are interposed between the windows. The thin slabs and the windows define a gap between the window and the adjacent thin slab. The flow manifolds are positioned such that the thin slabs and the windows are interposed between the flow manifolds in the transverse direction. The manifolds each have an elongated flow passageway. The elongated flow passageway of the manifolds and the gaps in the cell assembly define a flow path for a coolant fluid to travel in the transverse direction in the cell assembly.

In one arrangement, the zig-zag laser has a laser head as described above. The windows of the cell assembly have an interface window surface. The zig-zag laser also includes a pump source and an optical scrambler for coupling with the interface window surface for introducing energy into the cell assembly. A heat exchanger for laser coolant and series of lines deliver and remove coolant fluid from the laser head such that the coolant fluid flows in opposite transverse directions in adjacent gaps in the cell assembly.

In one arrangement, each of the windows are composed of quartz. A pair of the secondary flow manifolds are each formed of a quartz material. The transparent quartz/quartz interface of the secondary manifold and the quartz windows allow scattered fluorescence to pass from the cell assembly through to the secondary manifold therein moving the region of incidence away from the cell assembly and thus minimize heat in the cell assembly.

In one arrangement, each of the manifolds includes a primary flow manifold, a secondary flow manifold, and a plurality of headers for connecting coolant lines to heat exchanger. Each of the secondary manifolds has a channel, with shaped edges to promote laminar flow in the cell assembly, for each of the gaps as part of the elongated flow passageway. The secondary manifolds are positioned such that the thin slabs and the quartz windows are interposed between the secondary manifolds in the transverse direction. Each of the primary manifolds engages a respective secondary manifold. Each of the primary manifolds has a cavity and a passage for each of the outer channel portions in the secondary manifolds as part of a continuous elongated flow passageway. Each of the headers has a plenum for moving the coolant towards and away from the manifolds. The cross sectional area of the passageway of the laser head, which includes the cavity and the passage in the primary flow manifold and the outer channel portion and an inner channel portion in the secondary flow manifold reduces in area as the flow approaches the cell assembly. This reduction in volume in flow passageway provides a smooth flow transition therein ultimately achieving laminar flow between the slabs.

In one arrangement, the channels are shaped to narrow down in a tapered manner to promote a laminar flow of the coolant. The quartz windows and the thin slabs have rounded edges to provide a smooth transition to avoid flow instability and promote a laminar flow of the coolant fluid.

In one arrangement, each of the thin slabs has a longitudinal groove on each transversely opposite surface. Each of the secondary manifolds has corresponding longitudinal grooves for engaging the grooves in the slabs by way of the gasket. An expanded PTFE (expanded polytetrafluoroethylene) interface seal is interposed between the secondary manifold and the quartz windows and the thin slabs and forms within the grooves to interact and hold the thin slabs parallel to each other forming a seal against cross flow between flow channels.

In one arrangement, a plurality of perforated plates is located between the header and the primary manifold. Each plate has a plurality of perforations for passage of coolant therein removing the longitudinal flow component of the fluid.

In an arrangement, the cell assembly has a plurality of end spacer blocks extending in the transverse direction and located at the longitudinal ends of the thin slabs. The end spacer blocks are interposed between the quartz windows. One of the end spacer blocks is located at each end of the thin slab such that an end spacer block, the thin slab, and another end spacer block extend along a longitudinal direction. A plurality of optically transparent channel spacers are interposed between the thin slabs at the edges of the slabs in proximity to the end spacer blocks and between the thin slabs and the quartz windows to define the gap between the thin slabs and the gap between the thin slabs and the quartz windows.

In one arrangement, each of the secondary manifolds is formed of two components for improved quality and ease of fabrication. One component has the inner channel portions and the other component has the outer channel portions to form convergent generally vertical (or transverse) flow channel upstream of the cell assembly to promote laminar coolant flow in the cell assembly. The components are joined in a silicate-like network. The components are bonded together with a hydroxide-catalyzed process.

In an arrangement, a zig-zag laser has a pair of pump sources and a pair of optical scramblers. One of the optical scramblers is coupled to each pump source. The laser has a laser head including a cell assembly and a pair of manifolds. The cell assembly has a plurality of thin slabs and a pair of windows. Elongated flow passageways of the manifolds and gaps in the cell assembly define a flow path for a coolant fluid to travel in the transverse direction in the cell assembly. The manifolds of the laser head are connected to a series of flow lines for delivering and removing coolant fluid to the laser head from a heat exchanger such that the coolant fluid flows in opposite transverse directions in adjacent gaps in the cell assembly.

In an arrangement, a zig-zag laser head has a cell assembly with at least one thin slab for lasing. The thin slab has a thickness in a lateral direction, a height in a transverse direction, and a length in a longitudinal direction. The thin slab extends longitudinally. A pair of windows extend longitudinally and are positioned so that the at least one thin slab is interposed between the windows. Each of the quartz windows has an interface window surface for interfacing with the optical scrambler for introducing energy into the cell assembly. The thin slab and the windows define a gap between the window and the adjacent thin slab. The laser head has a pair of manifolds. The manifolds are positioned such that the thin slab and the windows are interposed between the manifolds with coolant flow in the transverse direction. The manifolds have an elongated flow passageway. The elongated flow passageway of the manifolds and the gaps in the cell assembly define a flow path for a coolant fluid to travel in the transverse direction in the cell assembly.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved zig-zag laser has a laser head that has the ability to generate a high power beam while effectively removing heat without degrading the beam quality. The generation of power creates heat in the cell assembly. The zig-zag laser head has a series of gaps interposed between the thin slabs, the gain medium, and between the thin slabs and quartz window to receive coolant and cool the cell assembly. The coolant flows transversely relative to the path of the laser and the flow of the coolant is in the opposite direction on each side of the thin slab to minimize the temperature gradient. The gaps in conjunction with inner channel portions in the secondary manifold flow the coolant through the cell assembly in a laminar manner therein not degrading the laser beam quality. In addition, the secondary manifold is made of quartz to create a transparent quartz/quartz interface between the secondary manifold and the cell assembly to allow the fluorescence to move away from the cell assembly and minimize heat in the cell assembly.

Figure 1:
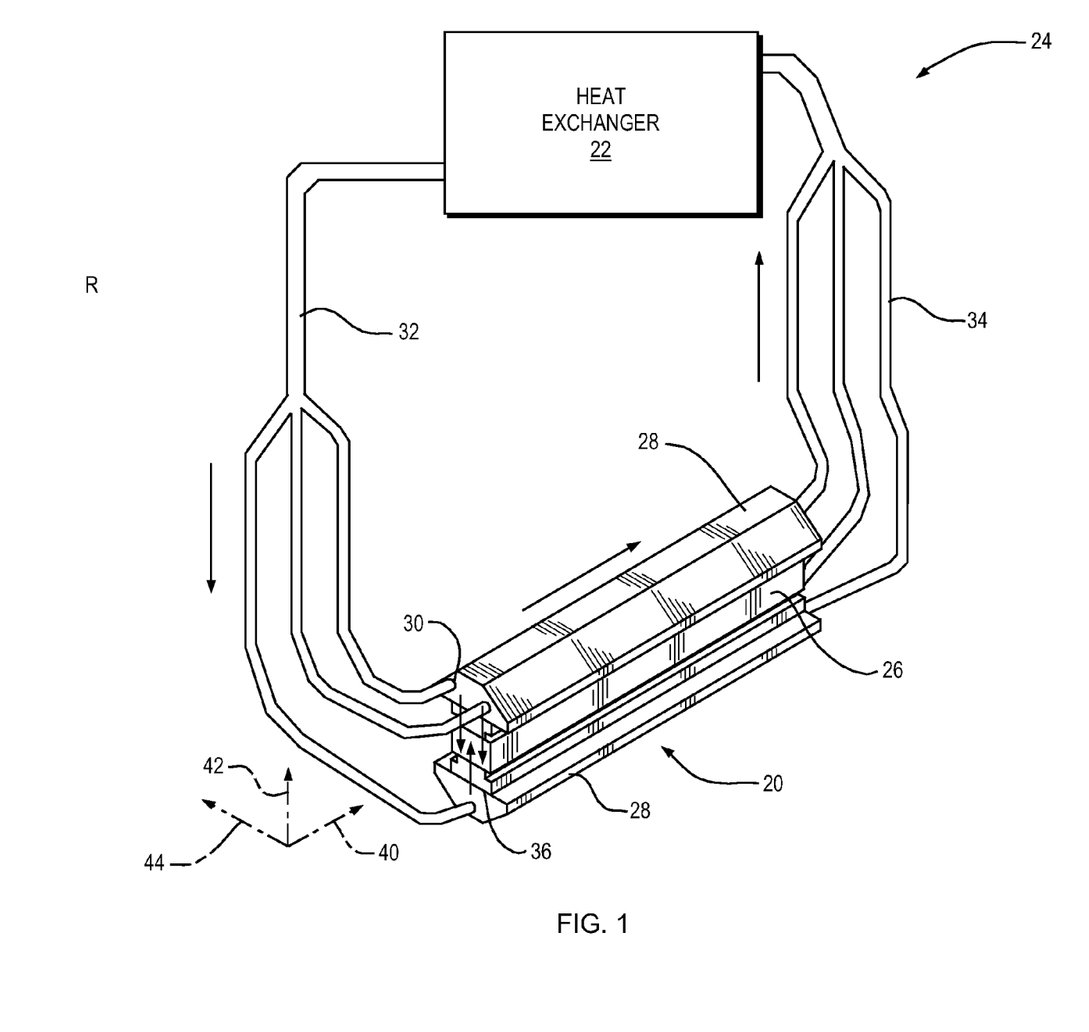
FIG. 1 is a schematic of a zig-zag laser head and cooling system.

FIG. 1 shows a perspective schematic view of a zig-zag laser head 20 and a heat exchanger unit 22 of the zig-zag laser 24. The zig-zag laser head 20 has a cell assembly 26 and a pair of manifold/header components 28. The laser head 20 has a series of passageways through which coolant passes to cool the cell assembly 26 as explained in further detail below with respect to other figures. These passageways are connected to ports 30 on the manifold/header components 28. A series of lines 32 and 34 are connected to the ports of the manifold/header components 28 and the heat exchanger unit 22 of the zig-zag laser 24 for moving the coolant between the laser head 20 and the heat exchanger unit 22.

A coordinate system is shown for assisting in describing the relative position of components. The cell assembly 26 and the manifold/header components 28 extend along a longitudinal direction 40. The manifold/header components 28 are positioned above and below the cell assembly 26 in a transverse direction 42. Orthogonal to both the longitudinal direction 40 and the transverse direction 42 is a lateral direction 44.

The zig-zag laser head 20 is configured such that the coolant flows through the cell assembly 26 in the transverse direction in a passageway in the cell assembly 26; the passageways in the cell assembly are referred to below as gaps. The coolant enters the manifold/header component 28 through ports 30 connected to lines 32 on one end of the manifold/header component 28, such as the left side of FIG. 1, and passes through passageways such that the coolant exits the laser head 20 through the other manifold/header component 28 at ports at the other end, such as the right side of FIG. 1. The cell assembly 26 has gaps as part of the passageways of the laser head 20. The passageways are arranged such that alternating gaps in the cell assembly 26 have the coolant flow flowing in opposite directions. The three arrows 36 represent the flow of the coolant in the cell assembly; the center arrow pointing up represents the coolant flowing upward in a gap in the cell assembly 26 and the outer two arrows pointing down represent the flow of the coolant in a pair of gaps adjacent to the first gap in the cell assembly 26. The passageways in the zig-zag laser head 20 are separated such that the coolant entering at the various ports, three in the arrangement shown, does not mix with each other until the coolant has exited the laser head 20 and is in the line 34 going to the heat exchanger 22.

The heat exchanger 22 of the zig-zag laser 24 takes heat away from the coolant before the coolant is sent back to the zig-zag laser head 20.

Figure 2:
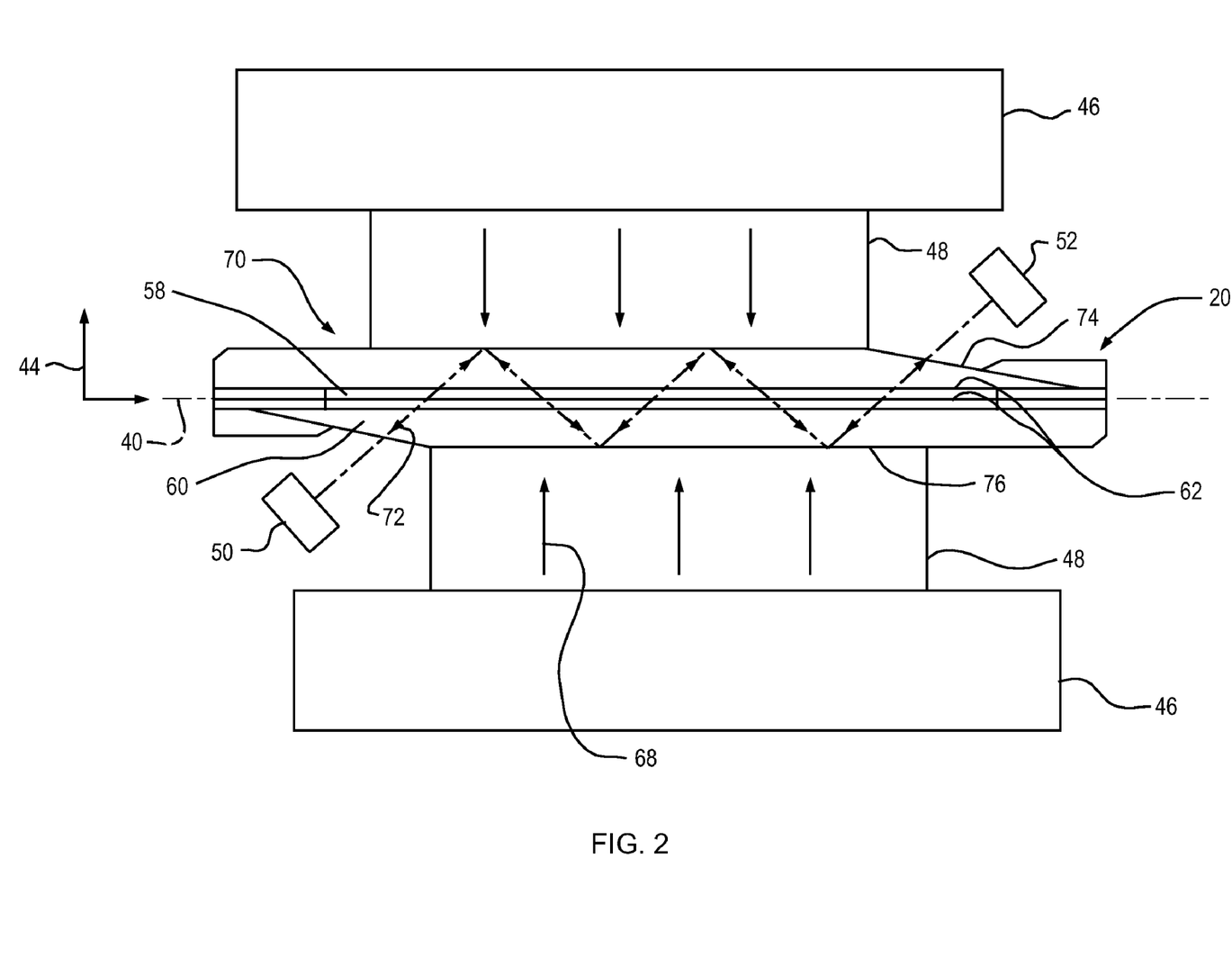
FIG. 2 is a top view of a schematic of the zig-zag laser with a cell assembly of the laser head and a pump source and scrambler.

FIG. 2 is a schematic top view of the zig-zag laser head 20 showing a pair of pump sources 46, a pair of optical scramblers 48, a mirror 50, and a semi-reflective mirror 52 of the zig-zag laser 24. The cell assembly 22 of the zig-zag laser head 20 has a pair of thin slabs 58 and a pair of quartz windows 60. The thin slabs 58 extend parallel along the longitudinal axis 40. Interposed between the thin slabs 58 is a gap 62. In addition, interposed between the thin slabs 58 and the adjacent quartz window 60 is also a gap 62. The gaps 62 which are shown more clearly in later figures have a coolant flowing through them in a transverse direction 42, in and out of the page in this FIG.

Each of the pump sources 46 of the zig-zag laser 24 feeds energy in the form of light, represented by arrows 68, through its respective optical scrambler 48 into the quartz window 60 and into the thin slabs 58. This energy from the pump sources 46 moves generally in the lateral direction 44 towards the thin slabs 58. The thin slabs 58 are the gain medium that are used to create high power laser light output by lasing action induced by pump light 68.

The optical cavity 70 of the zig-zag laser 20 is the quartz windows 60, the coolant, and the thin slabs 58. The laser flux, represent by line and arrows 72, inside the cell assembly 22 bounces off the outer surfaces of the quartz windows 60. The laser flux passes through the quartz windows 60, the coolant, and the thin slabs 58. The laser flux enters and exits the cell assembly 22 by a coupling window surface 74 on the quartz window 60. Each of the quartz windows 60 has one of the coupling window surfaces 74 for the passing of light (energy) from the optical cavity 70 to the mirror 50 and the semi-reflective mirror 52. The output beam of the laser is represented by arrow 78. Each of the quartz windows 60 has an interface window surface 76 for receiving and passing energy from the optical scrambler 48 to the cell assembly 26 and the thin slabs 58, the gain medium.

In one arrangement, the thin slabs 58 are Nd:YAG (neodymium-doped yttrium aluminum garnet) ceramics. The coolant is heavy water ($D_2O$ or $^2H_2O$).

Figure 3:
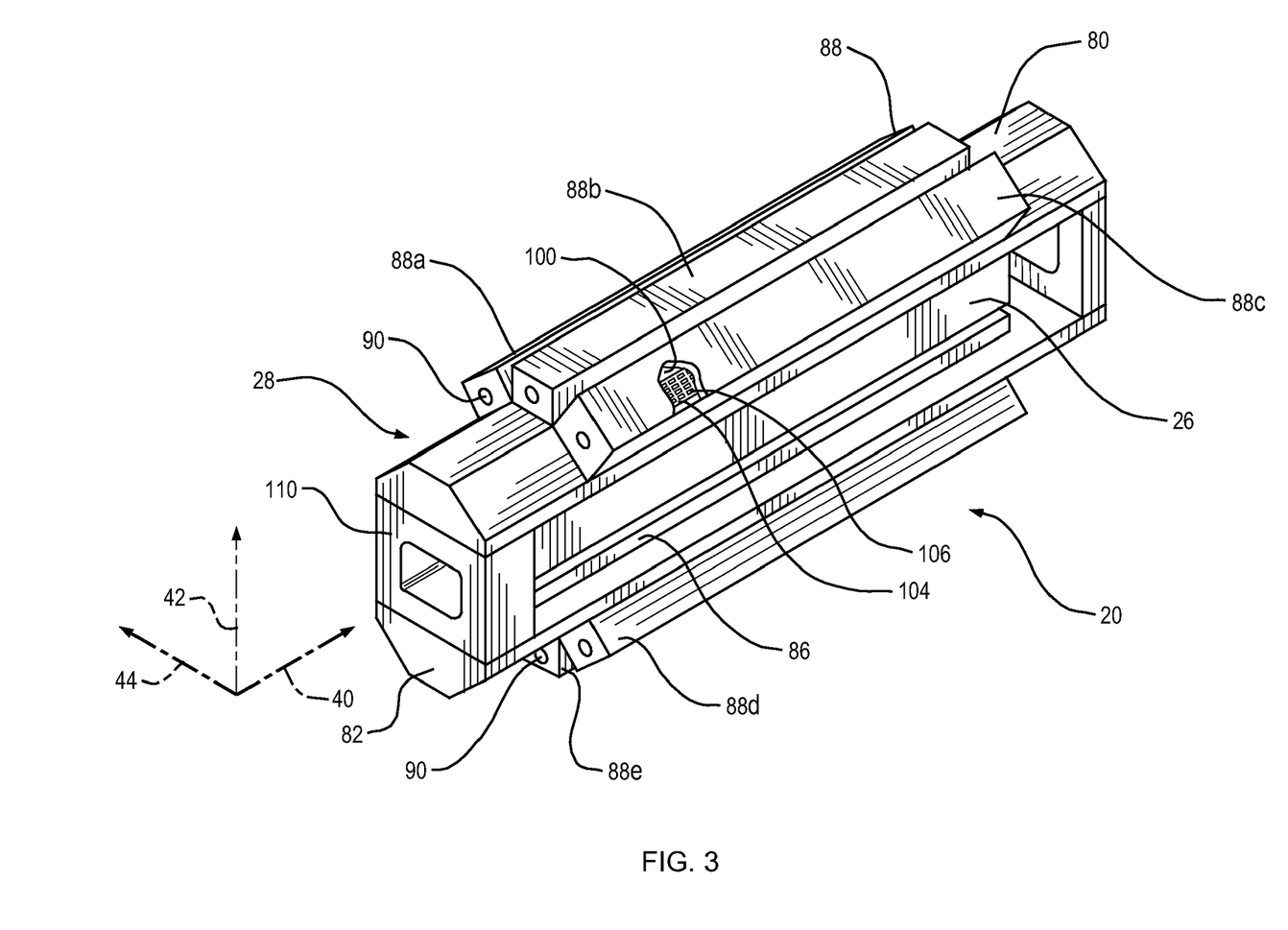
FIG. 3 is a perspective view of a zig-zag laser head with a portion of a header and primary manifold broken away.

FIG. 3 shows a perspective view of a zig-zag laser head 20. The zig-zag laser head 20 has the cell assembly 26 and the manifold/header components 28. The manifold/header components 28 have a pair of primary manifolds 80 and 82, a pair of secondary manifolds 86, only one of the secondary manifolds seen in FIG. 3, and a plurality of headers 88. The cell assembly 26 and the manifolds 80, 82, and 86 and the headers 88 extend along the longitudinal direction 40. The primary manifolds 80 and 82 are positioned above and below the cell assembly 26.

The manifolds 80, 82, and 86 and the headers 88 are used for flowing a coolant through the cell assembly 26. In the arrangement shown, the zig-zag laser head 20 has six headers 88. The three upper headers 88a, 88b, and 88c are shown. Two of the lower headers 88d and 88e are seen in FIG. 3.

Figure 6:
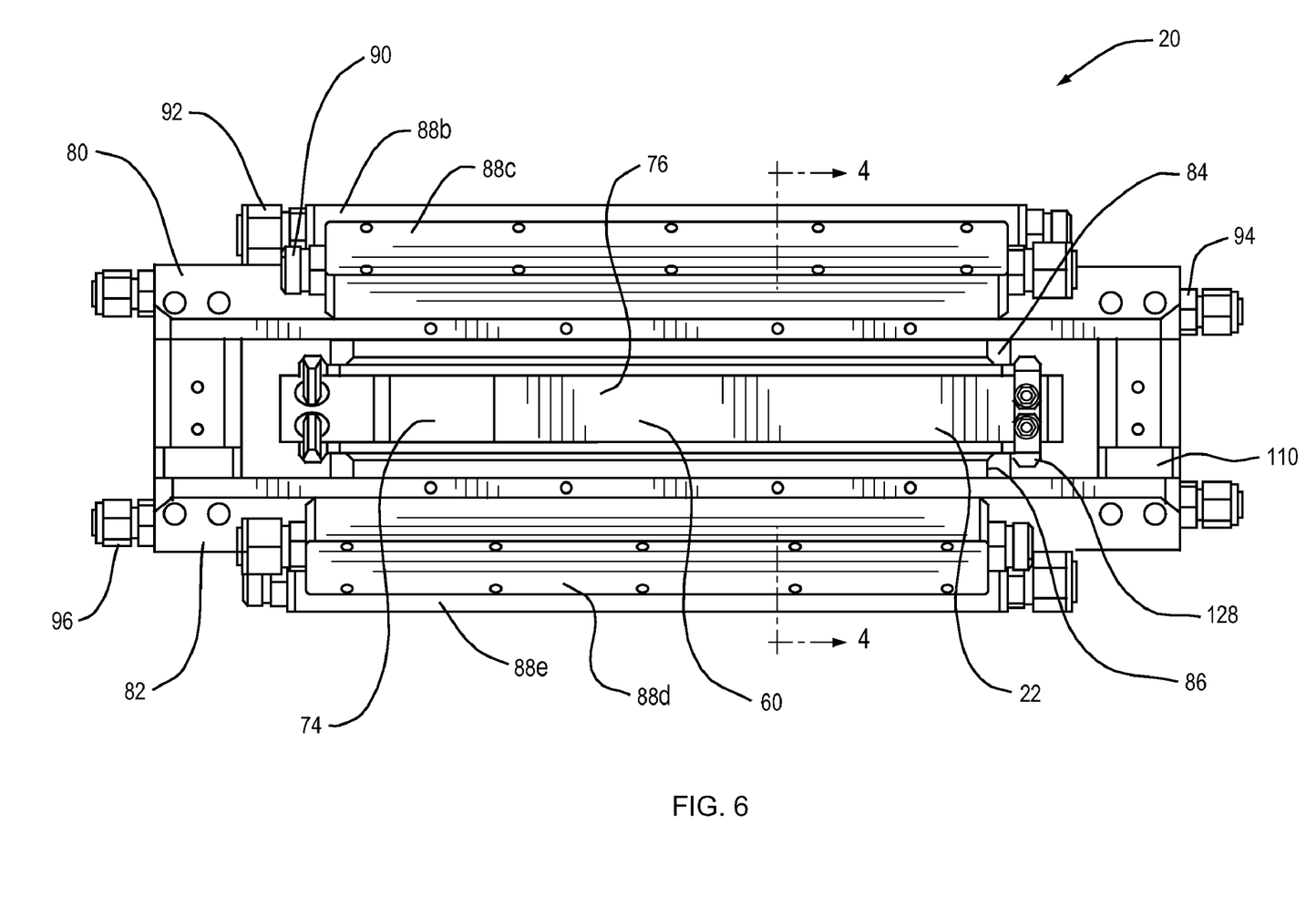
FIG. 6 is a side view of a zig-zag laser head.

Each of the headers 88 has a pair of ports 90. The ports are shown better in FIG. 6. One of the ports 90 on each of the headers 88 is capped with a cover 92, as seen in FIG. 6, and the other port 90 is secured to a line, such as the lines 32 and 34 show in FIG. 1. In the arrangement shown, the coolant is pumped into the headers 88a, 88c, and 88e and pumped out headers 88b and 88d.

Still referring to FIG. 3, a portion of the header 88c is broken away. The header 88c has a plenum 100. The fluid that enters the port 90 is received in the plenum 100. The header 88c is connected to the primary manifold 80 that has an aligned cavity. Interposed between the two cavities is a plate 104 having a plurality of perforations 106. The coolant as it enters the header 88c has predominately a longitudinal flow direction. As the coolant passes through the perforations 106 in the plate 104, the coolant loses this longitudinal component and flows predominately in the transverse (up and down) direction.

Still referring to FIG. 3, the zig-zag laser head 20 has a pair of pillar blocks 110 retaining the primary manifolds 80 and 82 in position. The pillar blocks 110 and the primary manifolds 80 and 82 sandwich the secondary manifolds 86 and the cell assembly 26.

Figure 4:
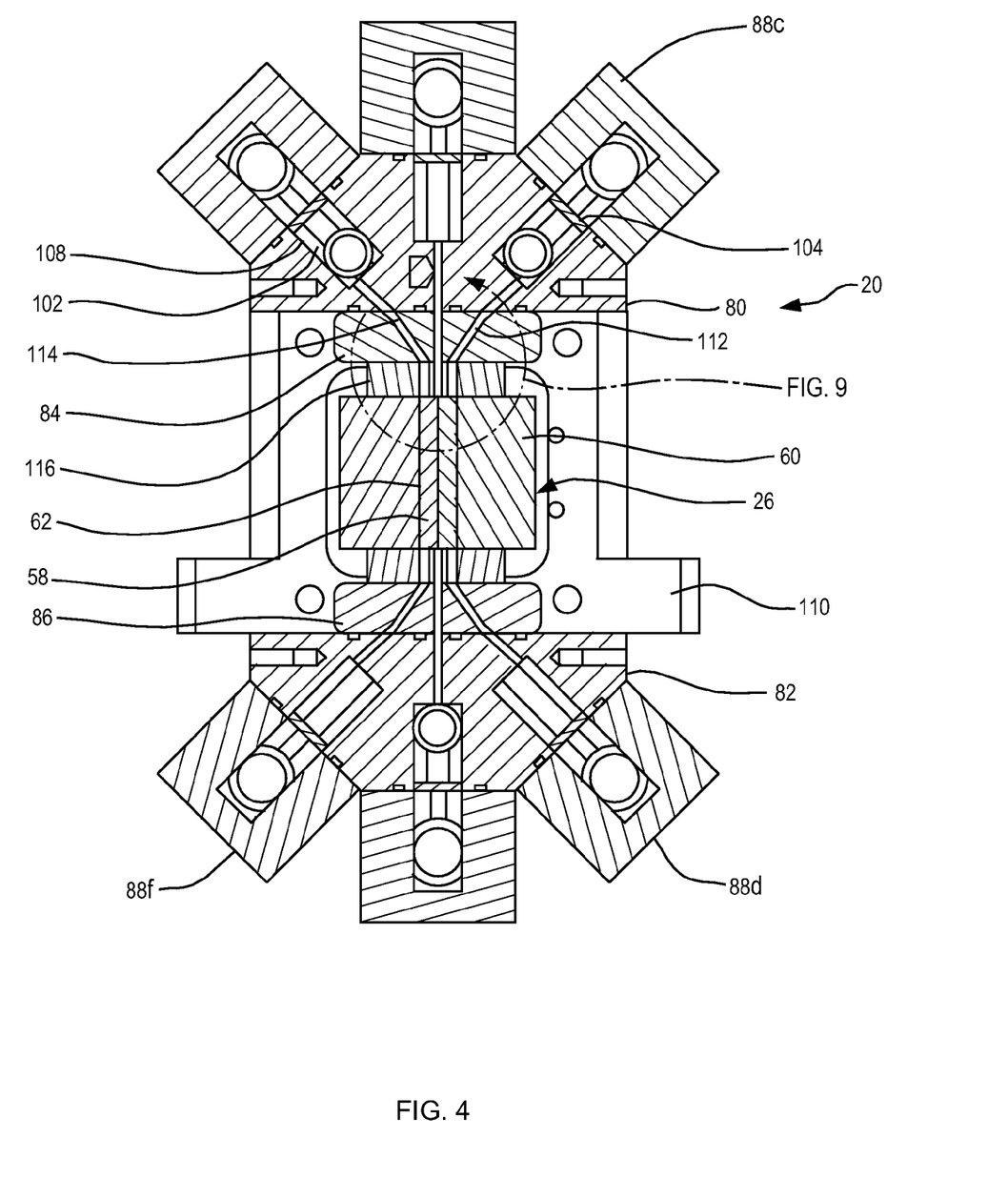
FIG. 4 is a sectional view of the zig-zag laser head.

FIG. 4 is a sectional view of the zig-zag laser head 20. The pillar block 110 is interposed between the upper primary manifold 80 and the lower primary manifold 82. The headers 88 are secured to the primary manifolds 80 and 82. Between the primary manifold 80 and 82 are the secondary manifolds 84 and 86 and the cell assembly 26 including the thin slabs 58 and the quartz window 60.

The thin slabs 58 of the cell assembly are interposed between the pair of the quartz windows 60. Interposed between the thin slabs 58 is one of the gaps through which the coolant flows. There are also gaps 62 interposed between the thin slabs and the adjacent quartz window 60. The gaps are seen better in FIGS. 7-9.

In the arrangement shown, there are two thin slabs 58 and therefore three gaps 62. While there is a header associated with each of the primary manifolds for each gap, only the flow of coolant associated with one gap will be described. The fluid in the header 88a enters through the port from a line 32, such as seen in FIG. 1, into the plenum 100. The header 88a is connected to the primary manifold 80 that has the aligned cavity 102. Interposed between the plenum 100 and the cavity 102, is the plate 104 with the plurality of perforations 106. The plate 104 is retained in a groove 108 formed in the primary manifold 80. The coolant as it enters the header 88a has predominately a longitudinal component. As the coolant passes through the perforations in the plate 104, the coolant loses this longitudinal component.

The primary manifold 80 has a passage 112 that is connected to the cavity 102 through which the coolant can flow to an outer channel portion 114 in the secondary manifold 84. The outer channel portion 114 in the secondary manifold 84 narrows down into an inner channel portion 116. The inner channel portion 116 in the secondary manifold 84 is aligned with the gap 62 between the thin slab 58 and the quartz windows 60. The coolant then passes through an inner channel portion 116 and an outer channel portion 114 in the other secondary manifold 86 and into a passage 112 in the lower primary manifold 82.

The plenum 100 and the cavity 102 and the passage 112, the outer channel portion 114, and the inner channel portion 116 are part of the passageways described with reference to FIG. 1.

While the fluid is flowing downward in the gap 62 associated with the headers 88a and 88f, the gap 62 located on the other side of the thin slab, that associated with headers 88e and 88b has the fluid flowing upward. Therefore the fluid on either side of the thin slab 58 is flowing in opposite directions. By having the fluid flowing in opposite directions, the temperature gradient on the thin slab is more uniform. If the flow of the coolant was all in one direction, either up or down, the portion of the thin slab receiving the coolant last would be significantly hotter than the other edge because the amount of heat the coolant can receive decreases as the coolant temperature increases. As described below, one of the factors that the flow path in the cell assembly 26 is dependent on is the configuration of the lines 32 and 34, as seen in FIG. 1, to the headers 88.

Figure 5:
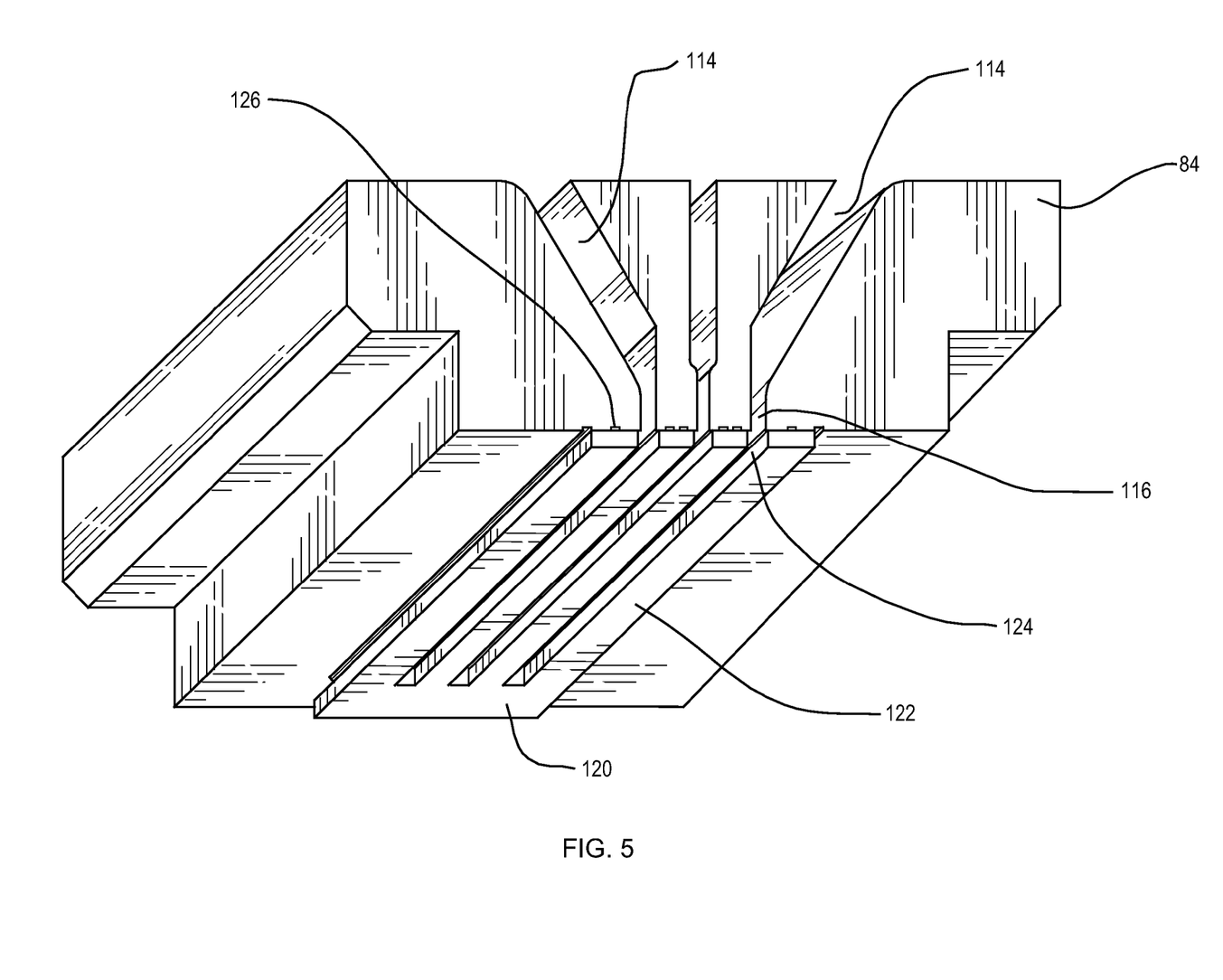
FIG. 5 is a sectional view taken in perspective of the interface seal engaging the secondary manifold.

Referring to FIG. 5, a sectional view taken in perspective of an interface seal 120 engaging the secondary manifold 28 is shown. The secondary manifold 84 has an inner channel portion 116 and its associated outer channel portion 114 for each gap 62. The interface seal 120 has the series of parallel strips 122 that define the series of slots 124 that underlie the inner channel portions 116.

The secondary manifold 84 has a series of grooves 126 that overlay the strips 122 of the interface seal 120. The grooves 126 are used in retaining the seal 120 as explained below.

Referring to FIG. 6, a side view of the zig-zag laser head 20 is shown. The cell assembly 26 is interposed between the two secondary manifolds 84 and 86. The pillar blocks 110 position the primary manifolds 80 and 82 relative to each other. The primary manifolds 80 and 82 sandwich the secondary manifolds 84 and 86 and the cell assembly 26 together. Until the cell assembly 26 is sandwiched between the secondary manifolds 84 and 86, the thin slabs 58, as seen in FIG. 4, can move in the transverse direction.

The primary manifolds 24 and 26 have access ports 94 that are each capped with a cover 96. The headers 88 each have a port 90 which is capped with a cover 92 and a port 90 connected to a line 32 and 34, such as shown in FIG. 1. Which end of the header 88 is connected to a line is dependent on if the coolant is flowing into or out of the header 88 in the arrangement shown. The lines 32 on the left side of FIG. 1 input coolant into the headers 88 and the lines 34 on the right side of FIG. 1 take coolant out of the headers. It is recognized that the arrangement can be changed including having all the coolant enter and exit from the same side.

Figure 7:
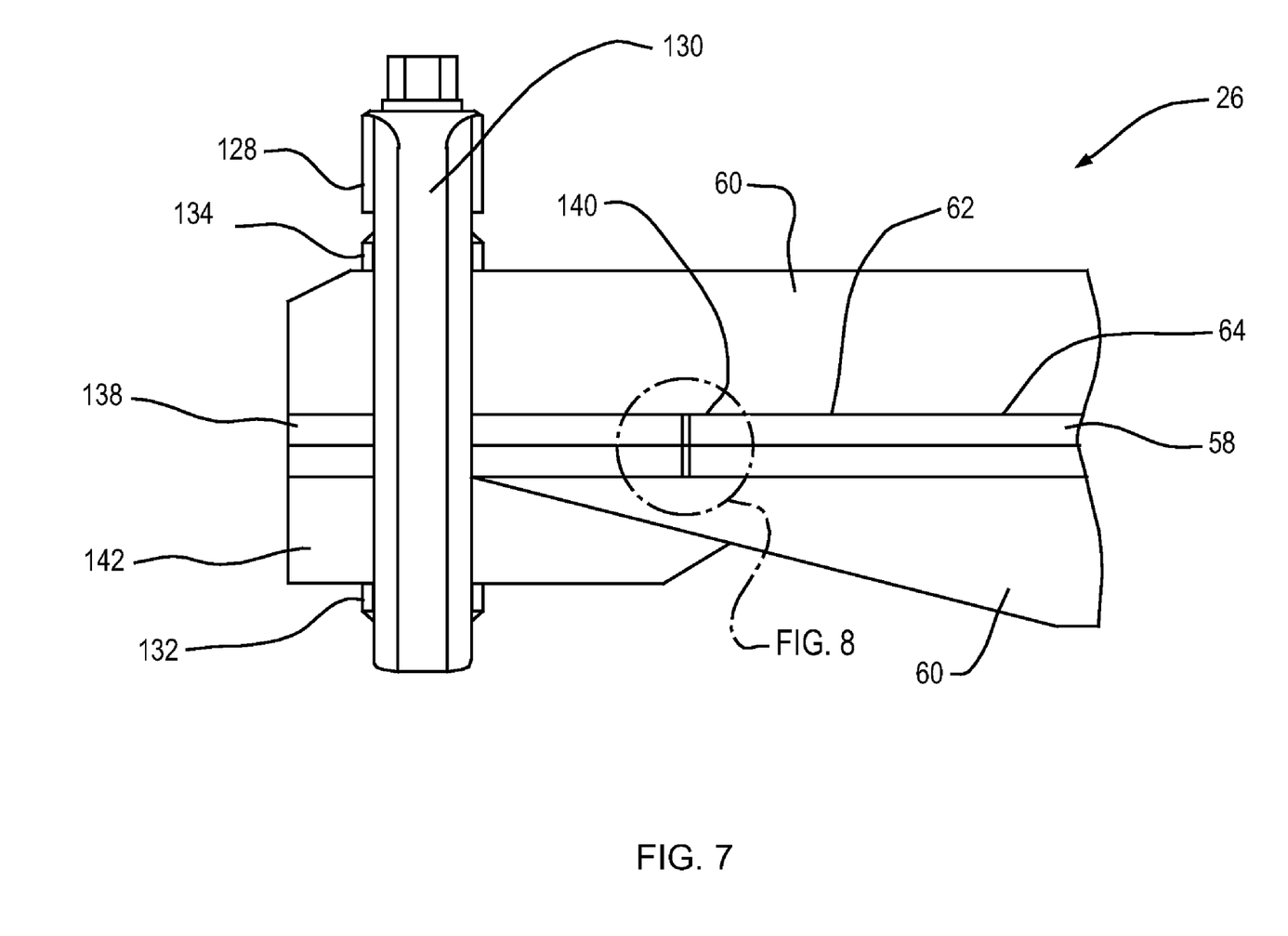
FIG. 7 is an enlarged view of a top view of one end of the cell assembly.

Still referring to FIG. 6, a plurality of clamps 128 hold the cell assembly 26. One of the "C" shaped clamps 128 is shown in FIG. 7. Each of the clamps 34 has a "C" shaped frame 130 with a fixed swivel pad 132 and an adjustable swivel pad 134. The adjustable swivel pad 134 has a plunger and a Belleville washer for adjusting the swivel pad 134 to engage the quartz window 60.

Still referring to FIG. 7, an enlarged top view of one end of the cell assembly 26 is shown. Interposed between the pair of quartz windows 60 are the thin slabs 58. The gaps 62 are adjacent to the thin slabs 58. On one side of the thin slab 58, the coolant 64 is flowing upward towards the upper primary manifold 80, or out of the page in FIG. 7 and on the other side of that thin slab, the coolant 64 is flowing downward toward the lower primary manifold 82, or into the page in FIG. 7.

To assist in positioning the thin slabs 58, at each of the longitudinal ends of the thin slab is located one of the end block spacers 138. The end block spacers 138 are positioned between the quartz windows 60. Interposed between the adjacent end block spacers 138 are optically transparent channel spacers 140. The channel spacers 140 extend between the ends of the thin slabs 58 and between the thin slabs 58 and the quartz windows 60 to define the gap 62 size by spacing the windows 60 with the end block spacers 138 and the channel spacers 140. The channel spacers 140 can be made of a material such as sapphire or YAG.

The cell assembly 26 in the arrangement shown has a mounting substrate 142 that engages the quartz window 60 and is used in conjunction with the clamp 128 to hold the cell assembly 26 together. The fixed swivel pad 132 engages the mounting substrate 142 and the other swivel pad, the adjustable swivel pad 134 engages the other quartz window 60.

In an arrangement, the end block spacers 138 are not doped ceramic such as an un-doped YAG (yttrium aluminum garnet) ceramic. By not being doped, the end block spacers 138 are not a gain medium. In the arrangement shown, the gaps are 7.5 mil (0.0075") in width, the lateral direction. Other gap spacers consistent with laminar flow can be used.

Figure 8:
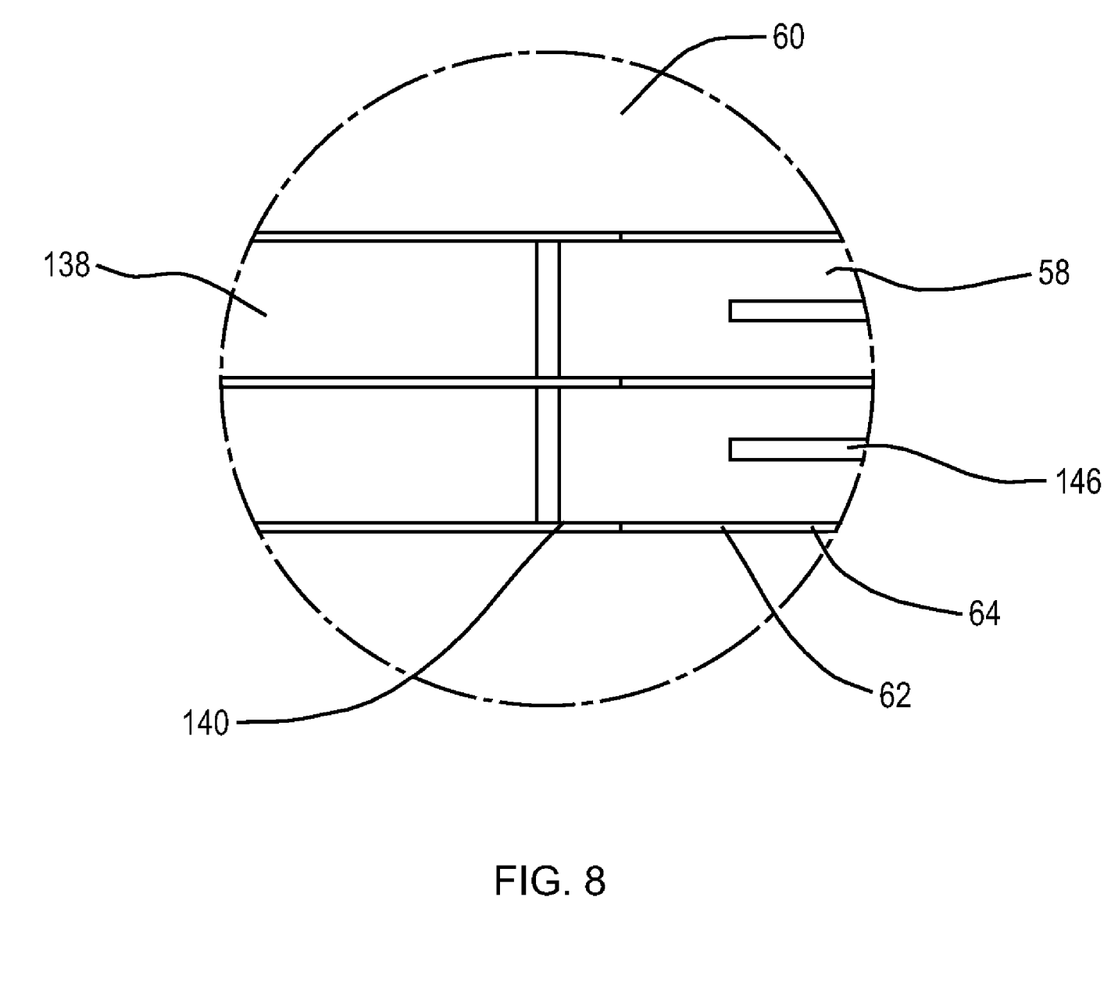
FIG. 8 is an enlarged view of the top view of the end space interface in the area 8 of FIG. 7.

Referring to FIG. 8, an enlarged view of a section of FIG. 7 shows the end block spacers 138 and thin slab 58 interface. Interposed between the pair of quartz windows 60 are the thin slabs 58. The gaps 62 adjacent to the thin slabs 58 are seen more clearly. On one side of the thin slab 58, the coolant 64 is flowing upward towards the upper primary manifold 80, or out of the page in FIG. 8 and on the other side of that thin slab, the coolant 64 is flowing downward toward the lower primary manifold 82, or into the page in FIG. 8.

One of the channel spacers 140 is interposed between the end block spacers 138. Other channel spacers 140 are interposed between the windows 60 and the end block spacers 138. This sandwich is used to define the gaps 62. This cell assembly 26 sandwich does not retain the thin slabs 58 in that the channel spacers 140 are not in tight engagement with the thin slabs 58; the end block spacers 138 are slightly larger in the lateral dimension than the thin slabs 58.

The thin slabs 58 each have a groove 146 that interacts with the interface seal 120 as described below with respect to FIG. 9.

Figure 9:
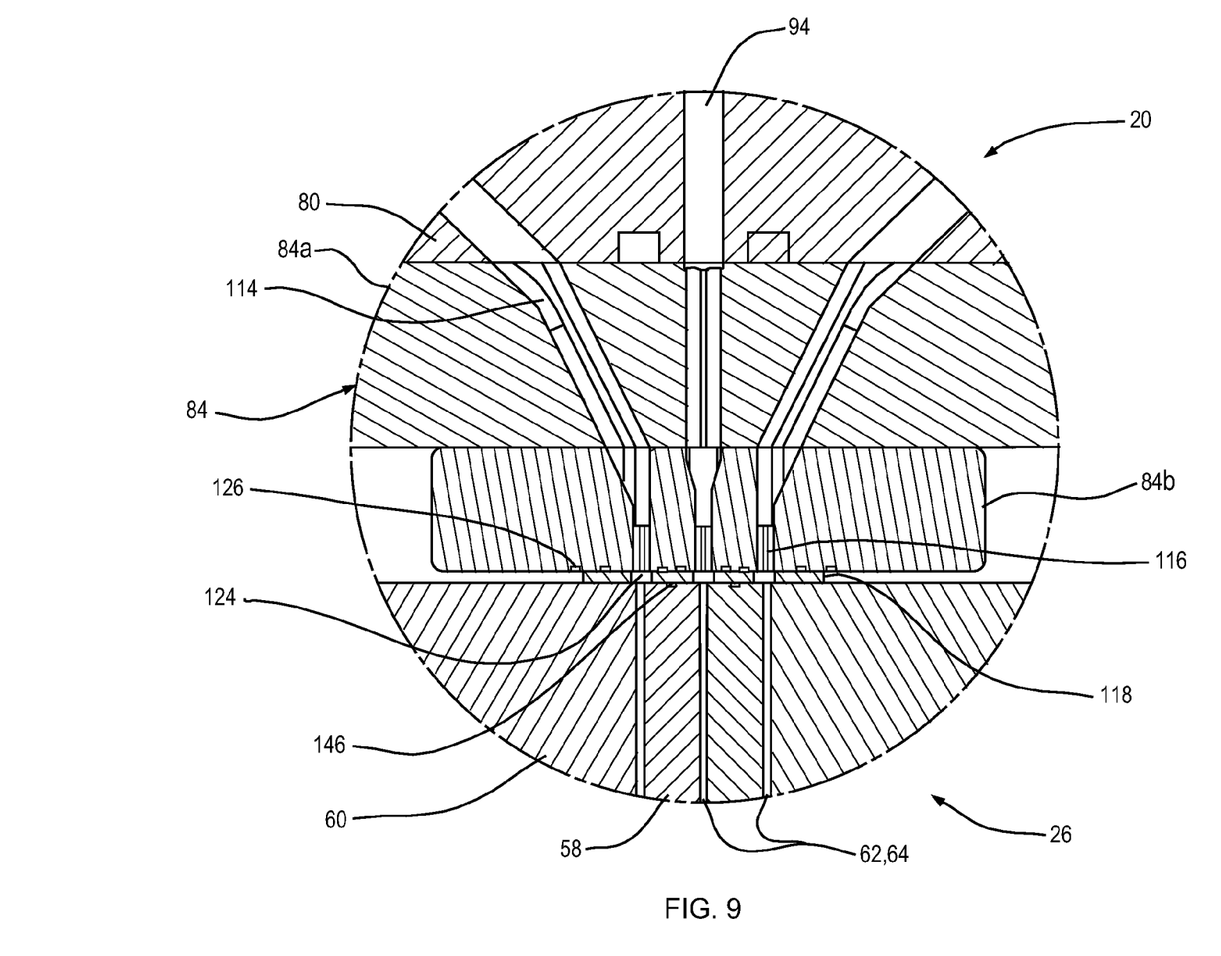
FIG. 9 is an enlarged view taken in section along the area 9 of FIG. 4.

FIG. 9 is an enlarged view taken in section along the area 9 of FIG. 4. The upper primary manifold 80 is shown engaging the secondary manifold 84. The passage 94 in the primary manifold 80 is aligned with the outer channel portion 114 in the secondary manifold 84. The outer channel portions 114 each narrow down into the inner channel portion 116 in the secondary manifold 84 which are aligned with an underlying gap 62. The secondary manifold 84 has grooves 126 and the thin slabs 58 have grooves 146 which work in conjunction with the interface seal 118 to retain the thin slabs 58 in position and parallel to the transverse axis.

In one arrangement, the flow in the cell assembly 26 has the coolant 64 flowing upward between the thin slabs 58 and flowing downward in the gaps 62 between the thin slab 58 and the adjacent quartz window 60. This flow in the transverse direction and in opposite directions, while assisting in minimizing temperature gradients in the cell assembly 26 would have a tendency to cause the thin slabs 58 to rotate inward on the upper edge. The interface seal 118 interposed between the cell assembly 26 and the secondary manifold 84 compresses but does not expand to fill the slots 124.

The thin slabs 58 have rounded edges for controlled flow entrance to prevent flow instability. In addition, the outer channel portion and the inner channel portion narrow down in a tapered manner to maintain a laminar flow of the coolant flow. In that the gaps 62 are part of the optical cavity, the flow characteristic of the coolant affects the beam quality. The plate 86 with the perforations 88 that redirects the flow of the coolant in the headers 88 is added to promote the flow of the coolant as a laminar flow.

In an arrangement, the secondary manifolds 84 and 86 are formed of two parts. In the FIG. 9, the secondary manifold 84 has a component 84a with the outer channel portion 114 and a component 84b with the inner channel portion 116. By forming the manifold as two components, the manufacturing of the outer channel portion 114 and the inner channel portion 116 is eased. The components are bonded together with a hydroxide-catalyzed process, such as described in U.S. Pat. No. 6,284,085. This patent is incorporated herein by reference.

The cross sectional area of the passageway of the laser head 20, which includes the passage 112 in the primary flow manifold and the outer channel portion 114 and an inner channel portion 116 in the secondary flow manifold reduces in area as the flow approaches the cell assembly 26. This reduction in volume in flow passageway provides a smooth flow transition therein ultimately achieving laminar flow between the slabs 58.

In an arrangement, the primary manifolds 80 and 82 are formed of a metal such as stainless steel and the secondary manifolds 84 and 86 are formed of quartz. In order to minimize the heat build up, the primary manifolds 80 and 82 have a reflective coating on the side that interfaces with the secondary manifold. This reflective coating, such a gold foil, reflects light thereby minimizing the absorption and heating of the primary manifolds by the stray fluorescent light.

With the secondary manifold being formed of quartz, the light that passes from the cell assembly 26 is not reflected or absorbed at the secondary manifold/cell assembly interface. Allowing the fluorescence to be transferred from the cell assembly minimizes absorption and heat concentrations in the cell assembly.

In one arrangement, the interface seal 118 is made of an expanded PTFE (expanded polytetrafluoroethylene.) The expanded PTFE has material properties such that upon compression, the material does not expand into the flow passageway.

While this invention has been particularly shown and described with references to preferred embodiments thereof, it will be understood by those skilled in the art that various changes in form and details may be made therein without departing from the spirit and scope of the invention as defined by the appended claims.

It is recognized that while two thin slabs 58 are shown in the Figures, that the zig-zag laser can have one thin slab or three or more thin slabs also.

What is claimed is:

1. A zig-zag laser head comprising:
   a cell assembly including:
     a plurality of thin slabs for lasing, each of the thin slabs having a thickness in a lateral direction, a height in a transverse direction, and a length in longitudinal direction, the thin slabs extending longitudinally and parallel to each other in the transverse and longitudinal directions, the thin slabs defining a gap between adjacent slabs;
     a pair of windows extending longitudinally and positioned so that the plurality of thin slabs are interposed between the windows; and
     the thin slabs and the windows defining a gap between the window and the adjacent thin slab;
   a pair of manifolds, the manifold positioned such that the thin slabs and the windows are interposed between the manifolds in the transverse direction, the manifolds having an elongated flow passageway; and
   the elongated flow passageway of the manifolds and the gaps in the cell assembly defining a flow path for a coolant fluid to travel in the transverse direction in the cell assembly;
   wherein the windows of the cell assembly have an interface window surface and the laser further comprising a pump source and an optical scrambler for coupling with the interface window surface for introducing energy into the cell assembly;
   further comprising a heat exchanger and wherein the manifolds of the laser head are connected to a series of lines delivering and removing coolant fluid such that the coolant fluid flows in opposite transverse directions in adjacent gaps in the cell assembly
   wherein:
   the pair of manifolds comprises a primary manifold having a plurality of primary manifold headers and a secondary manifold having a plurality of secondary manifold headers, the primary manifold opposing the secondary manifold, the thin slabs and the quartz windows substrates being disposed between the primary manifold and the secondary manifold along the transverse direction;
   a first manifold header of the plurality of primary manifold headers being configured to direct fluid along a first direction toward a first manifold header of the plurality of secondary manifold headers, along a first face of a thin slab, and within a first gap relative to the thin slab; and
   a second manifold header of the plurality of secondary manifold headers being configured to direct fluid along a second direction, the second direction opposing the first direction, toward a second manifold header of the plurality of primary manifold headers, along a second face of the thin slab, the second face opposing the first face, and within a second gap relative to the thin slab, the second gap opposing the first gap.

2. A zig-zag laser head of claim 1 wherein
   each of the windows are composed of quartz;
   each of the manifolds comprises a primary manifold, a secondary manifold, and a plurality of headers wherein each of the secondary manifolds formed of a quartz material and having a channel for each of the gaps as part of the elongated flow passageway, the secondary manifolds positioned such that the thin slabs and the quartz windows substrates are interposed between the secondary manifolds in the transverse direction;
   each of the primary manifolds engaging the respective secondary manifold, each of the primary manifolds having a cavity and a passage for each of the channels in the secondary manifolds as part of the elongated flow passageway of the manifolds; and
   each of the headers having a plenum for moving the coolant towards and away from the manifolds; and
   wherein the quartz/quartz interface of the secondary manifold and the quartz windows allow light to pass from the cell assembly to the secondary manifold therein moving the fluorescence away from the cell assembly and minimizing heat in the cell assembly.

3. A zig-zag laser head of claim 2 wherein the channel has an outer channel portion and an inner channel portion that narrow down in tapered manner to maintain a laminar flow of the coolant flow.

4. A zig-zag laser head of claim 2 wherein the quartz windows and the thin slabs having a rounded edge to create controlled entrance condition to reduce flow instability and promote a laminar flow of the coolant fluid.

5. A zig-zag laser head of claim 2 wherein each of the thin slabs having at least one longitudinal groove on each of its lateral edges and each of the secondary manifolds having a plurality of corresponding longitudinal grooves on a edge for engaging the grooves in the slabs, and further comprising an expanded PTFE (expanded polytetrafluoroethylene) interface seal having a series of slots, the expanded PTFE interface seal interposed between the secondary manifold and the quartz window and the thin slabs and interacting with the grooves for holding the thin slabs parallel to each other and forming a seal.

6. A zig-zag laser head of claim 2 further comprising a plurality of perforated plates, each plate having a plurality of perforations for passage of coolant therein removing the longitudinal flow component of the fluid.

7. A zig-zag laser head of claim 6 wherein the channel has an outer channel portion and an inner channel portion that narrow down in a tapered manner to maintain a laminar flow of the coolant flow and wherein the quartz windows and the thin slabs have rounded edges to promote a laminar flow of the coolant fluid.

8. A zig-zag laser head of claim 7 further comprising
   a plurality of end spacer blocks extending in the transverse direction and located at the longitudinal ends of the thin slabs, the end spacer blocks interposed between the quartz windows, one of the end spacer blocks located at each end of the thin slab such that an end spacer block, the thin slab, and another end spacer block extend along a longitudinal plane; and a plurality of non absorbing channel spacers interposed between the thin slabs at the edges of the slabs in proximity to the end spacer blocks and between the thin slabs and the quartz substrates to define the gap between the thin slabs and the gap between the thin slabs and the quartz windows.

9. A zig-zag laser head of claim 8 wherein each of the thin slabs has at least one groove on each of its lateral edges and each of the secondary manifolds has a plurality of grooves on a edge engaging the slabs, and further comprising an expanded PTFE (expanded polyetrafluoroethylene) interface seal having a series of slots, the expanded PTFE interface seal interposed between the secondary manifold and the quartz window and the thin slabs and interacting with the grooves for holding the thin slabs parallel to each other and forming a seal.

10. A zig-zag laser comprising:
a pair of pump sources;
a pair of optical scramblers, one of the optical scramblers coupled to each pump source;
a laser head comprising:
a cell assembly including:
a plurality of thin slabs for lasing, each of the thin slabs having a thickness in a lateral direction, a height in a transverse direction, and a length in longitudinal direction, the thin slabs extending longitudinally and parallel to each other in the transverse and longitudinal directions, the thin slabs defining a gap between adjacent slabs;
a pair of windows extending longitudinally and positioned so that the plurality of thin slabs are interposed between the windows, each of the windows having a window for interfacing with the optical scrambler for introducing energy into the cell assembly; and
the thin slabs and the windows defining a gap between the window and the adjacent thin slab;
a pair of manifolds, the manifolds positioned such that the thin slabs and the windows are interposed between the manifolds in the transverse direction, the manifolds having an elongated flow passageway; and
the elongated flow passageway of the manifolds and the gaps in the cell assembly defining a flow path for a coolant fluid to travel in the transverse direction in the cell assembly; and
a heat exchanger, wherein the manifolds of the laser head are connected to a series of lines delivering and removing coolant fluid such that the coolant fluid flows in opposite transverse directions in adjacent gaps in the cell assembly
wherein:
the pair of manifolds comprises a primary manifold having a plurality of primary manifold headers and a secondary manifold having a plurality of secondary manifold headers, the primary manifold opposing the secondary manifold, the thin slabs and the quartz windows substrates being disposed between the primary manifold and the secondary manifold along the transverse direction;
a first manifold header of the plurality of primary manifold headers being configured to direct fluid along a first direction toward a first manifold header of the plurality of secondary manifold headers, along a first face of a thin slab, and within a first gap relative to the thin slab; and
a second manifold header of the plurality of secondary manifold headers being configured to direct fluid along a second direction, the second direction opposing the first direction, toward a second manifold header of the plurality of primary manifold headers, along a second face of the thin slab, the second face opposing the first face, and within a second gap relative to the thin slab, the second gap opposing the first gap.

11. A zig-zag laser of claim 10 wherein each of the windows is composed of quartz;
each of the manifolds comprises a primary manifold, a secondary manifold, and a plurality of headers wherein each of the secondary manifolds formed of a quartz material and having an inner channel portion for each of the gaps as part of the elongated flow passageway, the inner channel portion narrowing from an outer channel portion reducing the cross sectional area in the flow passageway as the passageway approaches the cell assembly providing a smooth flow transition, the secondary manifolds positioned such that the thin slabs and the quartz windows are interposed between the secondary manifolds in the transverse direction;
each of the primary manifolds engaging the respective secondary manifold, each of the primary manifolds having a cavity and a passage for each of the outer channel portions in the secondary manifolds as part of the elongated flow passageway of the manifolds; and
each of the headers having a plenum for moving the coolant towards and away from the manifolds; and
wherein the quartz/quartz interface of the secondary manifold and the quartz windows allows light to pass from the cell assembly to the secondary manifold therein moving the fluorescence point away from the cell assembly and minimizing heat in the cell assembly.

12. A zig-zag laser head comprising:
a cell assembly including:
at least one thin slab for lasing, the thin slab having a thickness in a lateral direction, a height in a transverse direction, and a length in a longitudinal direction, the thin slab extending longitudinally;
a pair of windows extending longitudinally and positioned so that the at least one thin slab is interposed between the windows, each of the quartz windows having a window for interfacing with the optical scrambler for introducing energy into the cell assembly; and
the thin slabs and the windows defining a gap between the window and the adjacent thin slab;
a pair of manifolds, the manifold positioned such that the thin slabs and the windows are interposed between the manifolds in the transverse direction, the manifolds having an elongated flow passageway; and
the elongated flow passageway of the manifolds and the gaps in the cell assembly defining a flow path for a coolant fluid to travel in the transverse direction in the cell assembly;
wherein the manifolds of the laser head are connected to a series of lines delivering and removing coolant fluid such that the coolant fluid flows in opposite transverse directions in adjacent gaps in the cell assembly
wherein:
the pair of manifolds comprises a primary manifold having a plurality of primary manifold headers and a secondary manifold having a plurality of secondary manifold headers, the primary manifold opposing the secondary manifold, the thin slabs and the quartz windows substrates being disposed between the primary manifold and the secondary manifold along the transverse direction;
a first manifold header of the plurality of primary manifold headers being configured to direct fluid along a first direction toward a first manifold header of the plurality of secondary manifold headers, along a first face of a thin slab, and within a first gap relative to the thin slab; and a second manifold header of the plurality of secondary manifold headers being configured to direct fluid along a second direction, the second direction opposing the first direction, toward a second manifold header of the plurality of primary manifold headers, along a second face of the thin slab, the second face opposing the first face, and within a second gap relative to the thin slab, the second gap opposing the first gap.

13. A zig-zag laser head of claim 12 wherein each of the manifolds comprises a primary manifold, a secondary manifold, and a plurality of headers wherein each of the secondary manifolds having an inner channel portion for each of the gaps as part of the elongated flow passageway, the inner channel portion narrowing from an outer channel portion; the secondary manifolds positioned such that the thin slabs and the windows substrates are interposed between the secondary manifolds in the transverse direction, the outer channel portion and the inner channel portion narrow down in a tapered manner to maintain a laminar flow of the coolant flow;

each of the primary manifolds engaging the secondary manifold, each of the primary manifolds having a cavity and a passage for each of the outer channel portions in the secondary manifolds as part of the elongated flow passageway of the manifolds; and each of the headers having a plenum for moving the coolant towards and away from the manifolds; and wherein the windows and the thin slabs have rounded edges to create a laminar flow of the coolant fluid.

14. A zig-zag laser head of claim 12 further comprising a plurality of perforated plates, each plate having a plurality of perforations for passage of coolant therein removing the longitudinal flow component of the fluid.

15. A zig-zag laser head of claim 12 wherein the thin slab is a plurality of thin slabs for lasing, the thin slabs extending longitudinally and parallel to each other in the transverse plane and a gap interposed between each of the thin slabs in addition to the gap interposed between the thin slabs and the windows.

16. A zig-zag laser head of claim 15 wherein each of the manifolds comprises a primary manifold, a secondary manifold, and a plurality of headers wherein each of the secondary manifolds having an inner channel portion for each of the gaps as part of the elongated flow passageway, the inner channel portion narrowing from an outer channel portion; the secondary manifolds positioned such that the thin slabs and the windows are interposed between the secondary manifolds in the transverse direction, the outer channel portion and the inner channel portion narrow down in a tapered manner to maintain a laminar flow of the coolant flow each of the primary manifolds engaging the secondary manifold, each of the primary manifolds having a cavity and a passage for each of the outer channel portions in the secondary manifolds as part of the elongated flow passageway of the manifolds; and each of the headers having a plenum for moving the coolant towards and away from the manifolds; and wherein each of the thin slabs has at least one groove on each of its lateral edges and each of the secondary manifolds has a plurality of grooves on an edge engaging the slabs, and further comprising an expanded polyetrafluoroethylene (PTFE) interface seal having a series of slots, the expanded PTFE interface seal interposed between the secondary manifold and the quartz window and the thin slabs and interacting with the grooves for holding the thin slabs parallel to each other and forming a seal.

* * * * *